(12) United States Patent
Smith et al.

(10) Patent No.: US 7,139,544 B2
(45) Date of Patent: Nov. 21, 2006

(54) DIRECT DOWN-CONVERSION RECEIVER WITH TRANSCONDUCTANCE-CAPACITOR FILTER AND METHOD

(75) Inventors: Malcolm H Smith, Phoenix, AZ (US); Hongjiang Song, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 424 days.

(21) Appl. No.: 10/668,638

(22) Filed: Sep. 22, 2003

(65) Prior Publication Data

US 2005/0064839 A1   Mar. 24, 2005

(51) Int. Cl.
*H04B 1/10* (2006.01)
(52) U.S. Cl. ............... 455/307; 455/311; 455/341; 330/303; 333/172
(58) Field of Classification Search ............... 455/307, 455/296, 311, 341, 169.2, 302, 323; 330/307, 330/252, 260, 261, 278, 291, 295, 296, 299, 330/302, 303
See application file for complete search history.

(56) References Cited

U.S. PATENT DOCUMENTS

| | | | | |
|---|---|---|---|---|
| 5,384,501 A | * | 1/1995 | Koyama et al. | 327/336 |
| 6,400,218 B1 | * | 6/2002 | Zocher et al. | 327/560 |
| 6,549,074 B1 | * | 4/2003 | Ugajin et al. | 330/258 |
| 6,990,327 B1 | * | 1/2006 | Zheng et al. | 455/307 |
| 7,002,409 B1 | * | 2/2006 | Aram | 330/98 |
| 2002/0163384 A1 | * | 11/2002 | Hasegawa | 330/258 |
| 2003/0146789 A1 | * | 8/2003 | Mitteregger | 330/260 |
| 2004/0120421 A1 | * | 6/2004 | Filipovic | 375/316 |
| 2004/0164795 A1 | * | 8/2004 | Ueno et al. | 330/69 |

* cited by examiner

*Primary Examiner*—Edward F. Urban
*Assistant Examiner*—Blane J. Jackson
(74) *Attorney, Agent, or Firm*—Schwegman, Lundberg, Woessner & Kluth, P.A.

(57) ABSTRACT

A direct-down conversion receiver may include a transconductance-capacitor (GmC) filter to filter undesirable mixing products and provide a filtered baseband-differential signal. The GmC filter may include first and second transconductance-capacitor (GmC) circuits in series and a transconductance-feedback circuit in feedback with the second transconductance-capacitor circuit. The GmC circuits may comprise cross-coupled pairs of transistors to receive a baseband-differential signal and generate a differential output current. The GmC circuits may also comprise MOSCAPs coupled respectively between the differential inputs of the GmC circuit and internal-feedback nodes. In some embodiments, a substantially-constant bias voltage may be maintained across the voltage-dependent capacitors to allow the voltage-dependent capacitors to provide a substantially constant capacitance.

32 Claims, 4 Drawing Sheets

GmC FILTER

RECEIVER

GmC FILTER

GmC FILTER

TRANSCONDUCTANCE - CAPACITOR CIRCUIT

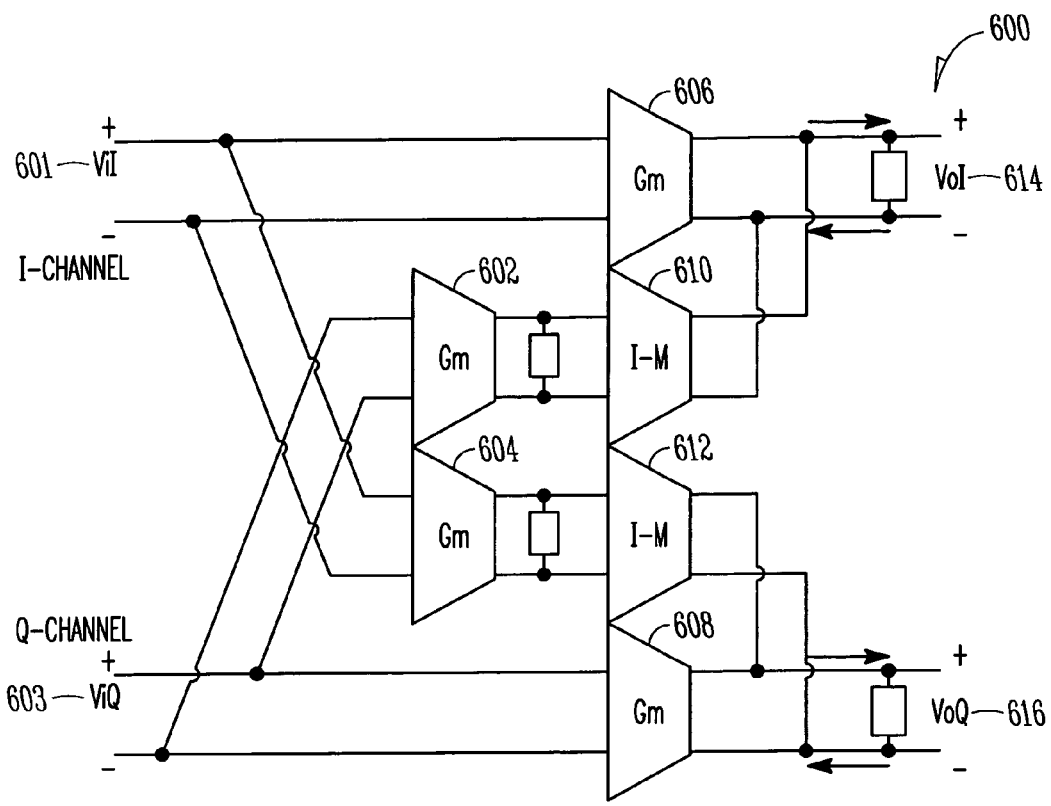
FIG. 6 GmC POLYPHASE FILTER
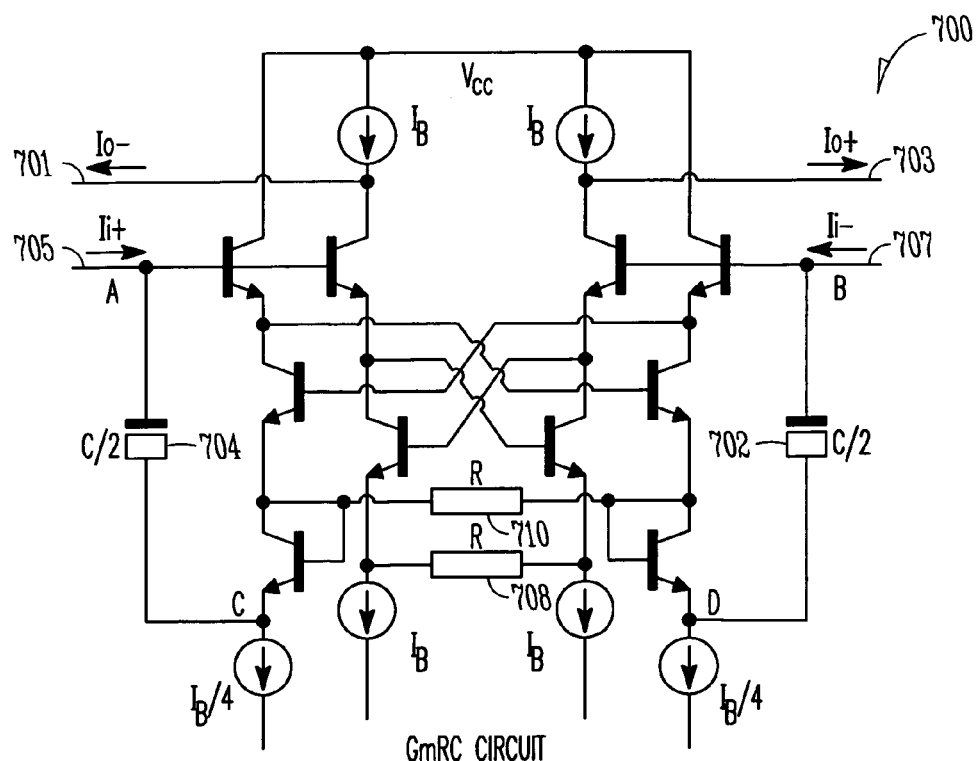
FIG. 7 GmRC CIRCUIT

DIRECT DOWN-CONVERSION RECEIVER WITH TRANSCONDUCTANCE-CAPACITOR FILTER AND METHOD

TECHNICAL FIELD

Embodiments of the present invention pertain to electronic circuits, in some embodiments, to receivers for wireless communications, and in some embodiments to transconductance circuits used for filtering.

BACKGROUND

In many wireless communication systems, RF signals are down-converted to an IF signal and/or baseband signal prior to conversion to digital signals. Filters are conventionally used to remove interferers from the IF or baseband signal in order to decrease the signal's dynamic range which may be helpful in the subsequent conversion from an analog baseband signal to a digital signal. With the move from superheterodyne receivers to direct-down conversion receivers, the filtering has moved from being off-chip passive filtering at the IF frequency to being on-chip active filtering at a baseband frequency. One important parameter in receivers is noise figure. Because the noise figure of baseband filters may, in some cases, significantly affect the overall receiver noise figure, a baseband filter's noise figure should be kept as low as possible. Unfortunately, this conventionally has required that on-chip capacitors used in the baseband filters be large in value to limit the added noise. Large on-chip capacitors, however, typically require a significant amount of the area of an RF integrated circuit.

Some conventional approaches have used the gate capacitance of MOSFETs to achieve higher-density and thus smaller capacitors (e.g., MOSCAPs); however these conventional approaches typically have to change the semiconductor manufacturing process to build a permanent channel under the gate so that a capacitance can be provided with no bias voltage. The additional masking step in the fabrication process for this channel can significantly increase the cost of an RF integrated circuit (RFIC).

Some other conventional approaches use MOSCAPs coupled to ground with a high-common-mode signal. These approaches generally require doubling of the capacitance for use in a differential circuit, which offsets at least some of the size reduction obtained from the density increase.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 6 is a block diagram of a transconductance-capacitor (GmC) polyphase filter in accordance with some embodiments of the present invention; and FIG. 7 is a circuit diagram of current-mode transconductance-resistor-capacitor (GmRC) circuit in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
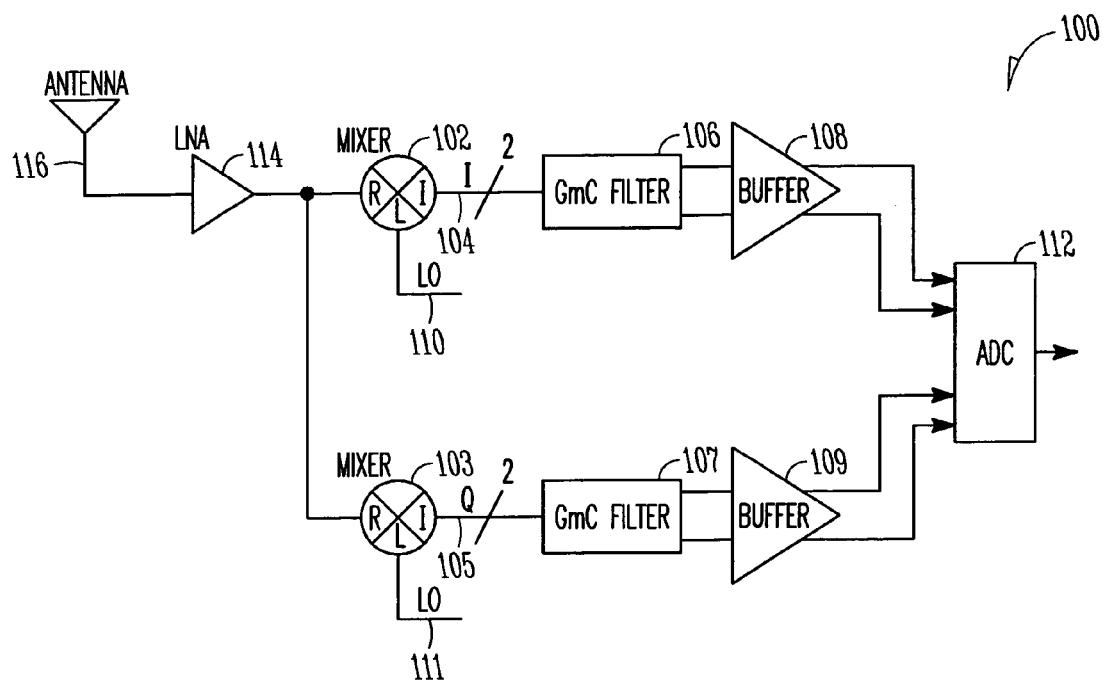
FIG. 1 is a block diagram of a receiver in accordance with some embodiments of the present invention.

FIG. 1 is a block diagram of a receiver in accordance with some embodiments of the present invention. Receiver 100 may be a direct down-conversion receiver that directly converts a received RF signal to a baseband signal without an intermediate step of converting to an IF signal. In some embodiments, receiver 100 may be a zero-IF receiver. In some other embodiments, receiver 100 may be a low-IF receiver in which an IF signal close to zero frequency is generated. Receiver 100 comprises mixer 102 to convert an RF signal directly to baseband-differential signal 104, and transconductance-capacitor (GmC) filter 106 to provide a filtered baseband-differential signal. In accordance with some embodiments of the present invention, GmC filter 106 may include first and second GmC circuits in series and a transconductance (Gm) feedback circuit in feedback with the second GmC circuit. GmC filter 106 may, among other things, filter undesirable mixing products and interfering signals and may reduce in-band distortion and noise.

In some embodiments, receiver 100 may also comprise antenna 116 to receive the RF signal, low-noise amplifier (LNA) 114 to amplify the received RF signal and to provide an amplified RF signal with a low-noise figure, and voltage buffer 108 to receive the filtered baseband-differential signal from GmC filter 106 to provide an output differential signal to analog-to-digital converter (ADC) 112. In some embodiments, ADC 112 may be off-chip from receiver 100.

In some embodiments, receiver 100 may down-convert received RF signals to an in-phase (I) channel and a quadrature-phase (Q) channel, although the scope of the invention is not limited in this respect. In these embodiments, mixer 102 may be an I-channel mixer to generate I-channel baseband-differential signal 104 based on local oscillator signal 110, GmC filter 106 may be an I-channel GmC filter and buffer 108 may be an I-channel buffer to receive the filtered I-channel baseband-differential signal from I-channel GmC filter 106. In these embodiments, receiver 100 may also comprise Q-channel mixer 103 to generate Q-channel baseband-differential signal 105 based on local-oscillator signal 111. Local oscillator signals 110 and 111 may be separated in phase by about 90 degrees. In these embodiments, receiver 100 may also include Q-channel GmC filter 107 to filter Q-channel baseband-differential signal 105, and Q-channel buffer 109 to receive the filtered Q-channel baseband-differential signal and provide a Q-channel output differential signal to ADC 112. ADC may provide a digital signal for use by other elements of the device or system in which receiver 100 may be part of.

In some embodiments, buffer 108 and/or buffer 109 may be voltage buffers to help insure that a load, such as ADC 112, has little or no effect on the filter function. In some embodiments, buffer 108 and/or buffer 109 may comprise a transconductance circuit with internal resistive loads to generate a voltage output with low-output impedance.

Receiver 100 may be part of a wireless communication device such as a personal digital assistant (PDA), a laptop or portable computer with wireless communication capability, a web tablet, a wireless telephone, a wireless headset, a pager, an instant messaging device, an MP3 player, a digital camera, an access point, cellular base station, or other device that may receive information wirelessly. In some embodiments, receiver 100 may receive RF communications in accordance with specific communication standards, such as the IEEE 802.11(a), 802.11(b), 802.11(g) and/or 802.16 standards for wireless local area network standards, although receiver 100 may also be suitable to receive communications in accordance with other techniques including the Digital Video Broadcasting Terrestrial (DVB-T) broadcasting standard, and the High performance radio Local Area Network (HiperLAN) standard. In some embodiments, receiver 100 may receive orthogonal frequency division multiplexed signals, which have symbol-modulated orthogonal subcarriers for transmitting information within an available spectrum. In some embodiments, receiver 100 may receive signals at either approximately 2.4 GHz or 5.0 GHz in accordance with particular wireless local area network standards, although the scope of the invention is not limited in this respect. In some embodiments, receiver 100 may receive wideband code-division multiple access (WCDMA) signals, although the scope of the invention is not limited in this respect.

Antenna 116 may comprise a directional or omnidirectional antenna, including, for example, a dipole antenna, a monopole antenna, a loop antenna, a microstrip antenna or other type of antenna suitable for reception and/or transmission of RF signals which may be processed by receiver 100. In some embodiments, antenna 116 may be a tuned antenna which may reduce or eliminate the need for switching elements between the antenna and LNA 114.

Although receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, at least portions of receiver 100 may be fabricated on a single monolithic semiconductor substrate, such as a radio-frequency integrated circuit (RFIC).

In some embodiments, receiver 100 may also include an image rejection filter (not illustrated) provided between GmC filters 106, 107 and ADC 112, although the scope of the invention is not limited in this respect. The image rejection filter may be a transconductance-capacitor (GmC) polyphase filter, described in more detail below.

Figure 2:
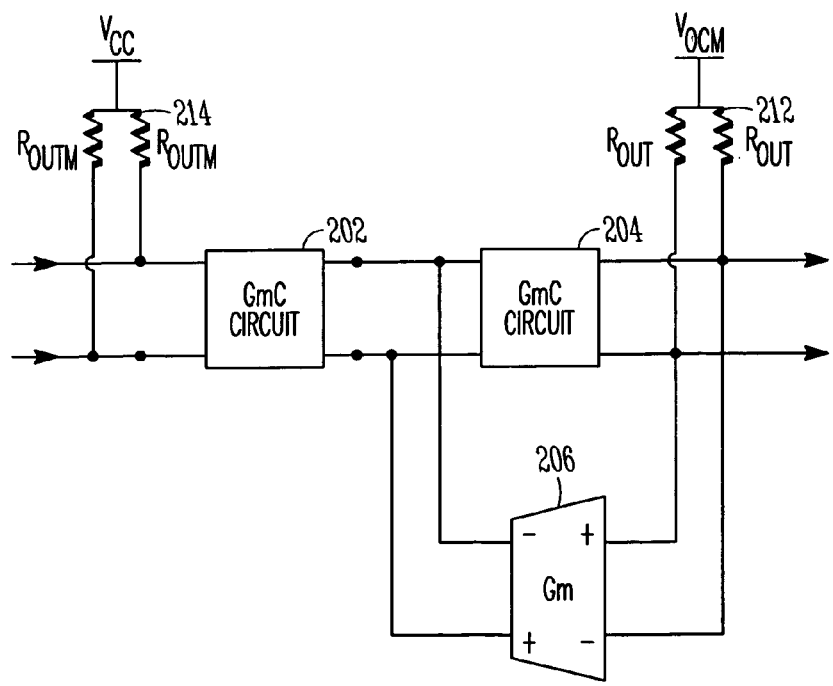
FIG. 2 is a block diagram of a transconductance-capacitor (GmC) filter in accordance with some embodiments of the present invention.

FIG. 2 is a block diagram of a transconductance-capacitor (GmC) filter in accordance with some embodiments of the present invention. GmC filter 200 may be suitable for use as GmC filter 106 (FIG. 1) and/or GmC filter 107 (FIG. 1), although other filters may also be suitable. GmC filter 200 receives an analog differential signal and may filter out-of-band components, including undesirable mixing products, from a baseband-differential signal. GmC filter 200 comprises GmC circuit 202 and GmC circuit 204 arranged in series, and transconductance-feedback circuit 206 in feedback with the second GmC circuit 204. In some embodiments, GmC filter 200 may have at least two poles. GmC circuit 202 may provide a first of the poles. GmC circuit 204 and transconductance-feedback circuit 206 may provide a second of the poles. Although filter 200 is illustrates as a two-stage filter, embodiments of the present invention are also applicable to filters having more that two stages.

When GmC filter 200 is used as GmC filter 106 (FIG. 1) or GmC filter 107 (FIG. 1), the first pole may be selected to correspond to an output pole of the corresponding mixer. The second pole of GmC filter 106 may be selected to compensate and/or to correspond to the first pole and a pole of transconductance-feedback circuit 206. The location of the poles may affect the ripple and bandwidth of filter 200 and may be set in accordance with system performance requirements.

In some embodiments, circuits 202, 204 and 206 may be transconductors (Gm) or transconductance differential-amplifiers which supply a differential-output current proportional to a differential-input voltage. A transconductance circuit may appear, from its output terminals, as a current source with a high-output impedance.

In some embodiments, GmC filter 200 may also comprise input resistors 214 to provide current to the differential inputs of GmC filter 200 for supplying current to GmC circuit 202. GmC filter 200 may also comprise output resistors 212 to provide current to the differential outputs of GmC filter 200 for supplying current circuits 204 and 206. Resistors 212 and 214 may operate as pull-up resistors for providing bias voltage (e.g., for the next stage in the case of resistors 212) as well as implementing the filter's transfer function.

Figure 3:
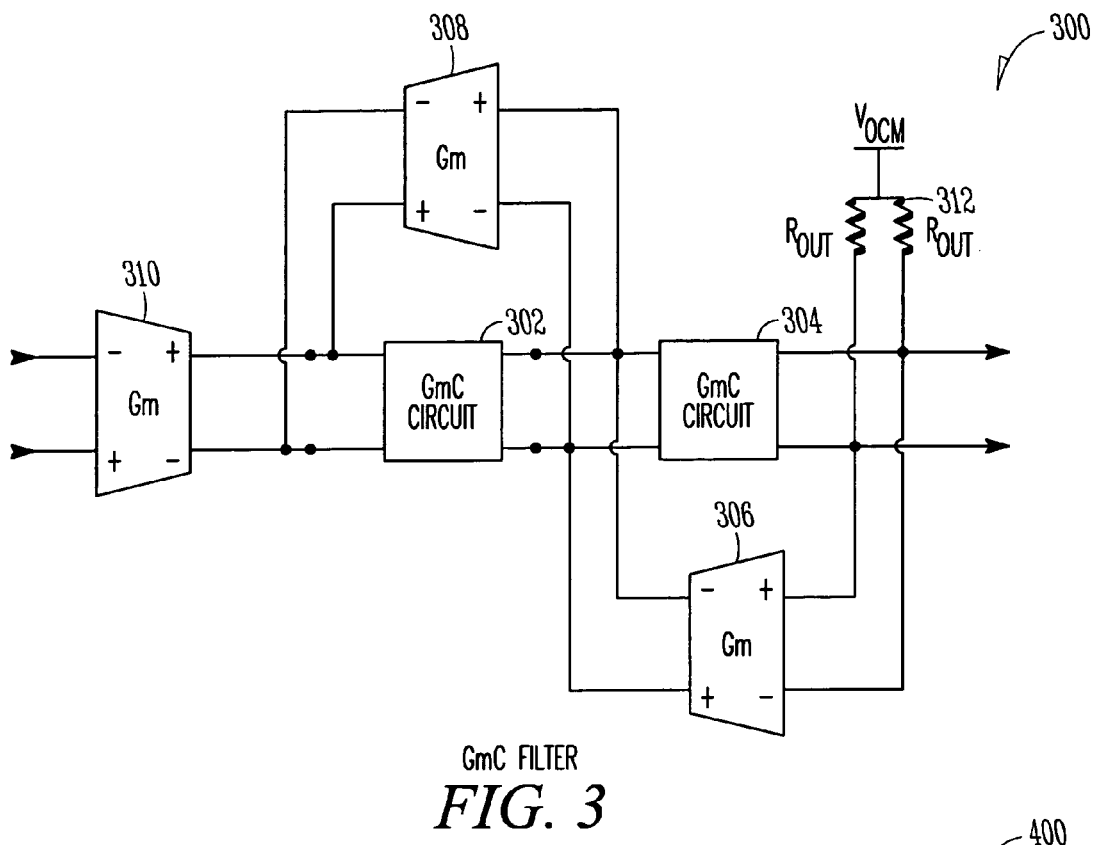
FIG. 3 is a block diagram of a transconductance-capacitor (GmC) filter in accordance with some other embodiments of the present invention.

FIG. 3 is a block diagram of a transconductance-capacitor (GmC) filter in accordance with some other embodiments of the present invention. GmC filter 300 may be suitable for use as GmC filter 106 (FIG. 1) and/or GmC filter 107 (FIG. 1), although other filters may also be suitable. GmC filter 300 receives an analog differential signal and may filter out-of-band components, such as undesirable mixing products, from a differential signal.

GmC filter 300 includes GmC circuit 302 arranged in series with GmC circuit 304 and transconductance-feedback circuit 306 in feedback with the GmC circuit 304. In some embodiments, GmC circuit 302 may be similar to GmC circuit 202 (FIG. 2), GmC circuit 304 may be similar to GmC circuit 204 (FIG. 2), and transconductance-feedback circuit 306 may be similar to transconductance-feedback circuit 206 (FIG. 2), although the scope of the invention is not limited in this respect. GmC filter 300 also comprises input transconductance (Gm) circuit 310, and transconductance-feedback circuit 308 in feedback with GmC circuit 302. In some embodiments, GmC filter 200 may also comprise output resistors 312 to provide current to the differential outputs of GmC filter 300 for supplying current to circuits 304 and 306.

In accordance with embodiments of the present invention, input Gm circuit 310 provides isolation from a prior circuit stage and may be used to set the gain. GmC circuits 302 and 304 provide the first and second integrator stages of filter 300. Feedback Gm circuits 308 and 306 provide the lossy elements of filter 300 and may be used to set the location of the poles.

Figure 4:
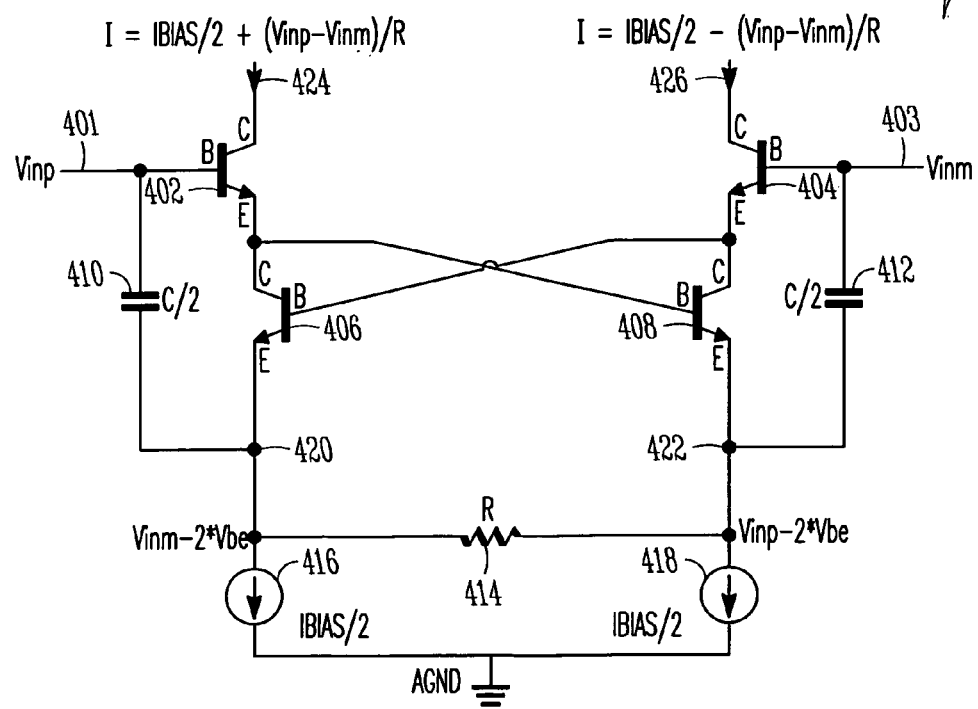
FIG. 4 is a circuit diagram of a transconductance-capacitor (GmC) circuit in accordance with some embodiments of the present invention.

FIG. 4 is a circuit diagram of a transconductance-capacitor (GmC) circuit in accordance with some embodiments of the present invention. Circuit 400 may be suitable for use as GmC circuit 202 (FIG. 2), GmC circuit 204 (FIG. 2), GmC circuit 302 (FIG. 3) and/or GmC circuit 304 (FIG. 3) although other circuit configurations may also be suitable. GmC circuit 400 may be a transconductance differential-amplifier which supplies a differential-output current substantially proportional to a differential-input voltage. In some embodiments, GmC circuit 400 may appear, from its output terminals, as a current source with a high-output impedance.

In some embodiments, GmC circuit 400 includes cross-coupled pairs of transistors 402, 404, 406, 408 to receive a baseband-differential signal across differential inputs 401 and 403 and may generate or draw a differential-output current at nodes 424 and 426. GmC circuit 400 may also include capacitors 410, 412 coupled respectively between differential inputs 401, 403 and internal-feedback nodes 420, 422 of GmC circuit 400, as illustrated.

In some embodiments, GmC circuit 400 may also comprise current sources 416, 418 coupled respectively to internal-feedback nodes 420, 422 to draw current through the transistors for generating the differential output current. GmC circuit 400 may also include feedback resistor 414 coupled between the internal-feedback nodes 420, 422 to proved feedback.

In some embodiments, capacitors 410 and 412 may be voltage-dependent capacitors. In these embodiments, during operation of GmC circuit 400, a substantially constant, minimum DC bias voltage may be maintained across capacitors 410 and 412 to allow capacitors 410 and 412 to provide and/or maintain a substantially constant capacitance. In some embodiments, capacitors 410 and 412 may comprise metal-oxide-semiconductor capacitors (MOSCAPs), and the substantially-constant bias voltage may allow the MOSCAPs to operate in a high-density and low-variation portion of the capacitors' capacitance-response curve to provide a substantially constant capacitance as a function of the voltage thereacross, although the scope of the invention is not limited in this respect. In some embodiments, the MOSCAPS may comprise a silicon-oxide dielectric layer with a metal top electrode deposited on a conducting semiconductor region that acts as a bottom electrode of the capacitor, although the scope of the invention is not limited in this respect. In some embodiments, the MOSCAPs may utilize a gate capacitance of metal-oxide-semiconductor field-effect transistors (MOSFETS), which may be operated in a high-capacitance region by providing a DC bias thereacross.

In some embodiments, the gate capacitance of the MOSCAPs operating in the high capacitance region may be up to ten times the density of conventional MIM capacitors, making circuit 400 particularly suitable for use in RF integrated circuits as well as in baseband filters, such as filters 200 (FIG. 2) and 300 (FIG. 3) and on-chip receivers, such as receiver 100 (FIG. 1).

Some conventional approaches have changed the manufacturing process to allow the use of the MOSFET gate capacitance by building a permanent channel under the gate so that a capacitance can be provided with no DC bias voltage. These conventional approaches require an additional masking step in the fabrication process which may significantly increase the fabrication cost of an RFIC.

In some embodiments, transistors 402, 404, 406 and 408 may comprise bipolar junction transistors (BJTs), although the scope of the invention is not limited in this respect. In these embodiments, the substantially-constant bias voltage provided thereacross may be approximately $2V_{BE}$ (e.g., around 1.2 to 1.5 volts) during the operation of GmC circuit 400. In some other embodiments, transistors 402, 404, 406 and 408 may comprise field-effect transistors, such as MOSFETS, although the scope of the invention is not limited in this respect.

In accordance with embodiments of the present invention, the current drawn by GmC circuit 400 at node 424 may be approximately equal to the bias current drawn by current source 416 plus the differential-input voltage (e.g., the voltage difference between differential inputs 401 and 403) divided by the feedback resistance. Likewise, the current drawn at node 426 may be approximately equal to the bias current drawn by current source 418 plus the differential-input voltage divided by the feedback resistance. When bipolar-junction transistors are used, the voltage at internal-feedback node 420 may be approximately equal to the voltage at differential input 403 (Vinm) minus twice the base-emitter voltage ($V_{BE}$) of the transistors. The voltage at internal-feedback node 422 may be approximately equal to the voltage at differential input 401 (Vinp) minus twice the base-emitter voltage ($V_{BE}$). Accordingly, a substantially-constant bias voltage may be maintained across capacitors 410 and 412 to allow the capacitors to provide a substantially constant capacitance.

From an AC operational perspective, capacitors 410 and 412 are operationally (not actually) coupled across differential inputs 401 and 403 to realize the integration function of the filter. This effectively combines the capacitance of capacitors 410 and 412 may provide an effective capacitance of "C" across differential inputs 401 and 403 when the capacitance of capacitors 410 and 412 is C/2.

Figure 5:
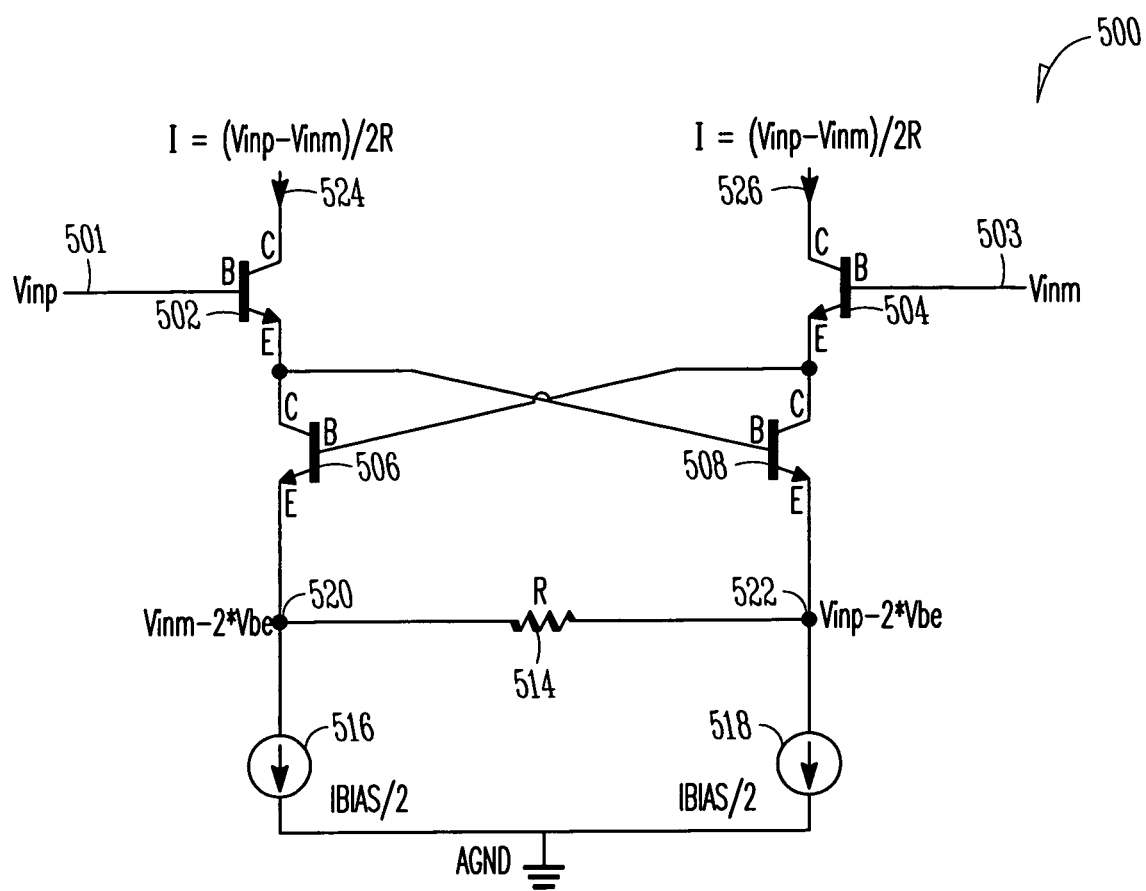
FIG. 5 is a circuit diagram of a transconductance (Gm) circuit suitable for use with some embodiments of the present invention.

FIG. 5 is a circuit diagram of a transconductance (Gm) circuit suitable for use with some embodiments of the present invention. Gm circuit 500 may be suitable for use as transconductance-feedback circuit 206 (FIG. 2), transconductance-feedback circuit 306 (FIG. 3), transconductance-feedback circuit 308 (FIG. 3) and/or input Gm circuit 310 (FIG. 3) although other circuits may also be suitable. Gm circuit 500 may be a transconductance differential-amplifier or a transconductor, which supplies a differential-output current substantially proportional to a differential-input voltage, although the scope of the invention is not limited in this respect.

Gm circuit 500 may comprise cross-coupled pairs of transistors 502, 504, 506 and 508 to receive the baseband-differential signal across differential inputs 501 and 503 and to generate a differential-output current drawn respectively across nodes 524 and 526. Gm circuit 500 may also comprise current sources 516, 518 coupled respectively to internal-feedback nodes 520, 522 as illustrated to draw current through the transistors for generating the differential output current. Gm circuit 500 may also comprise feedback resistor 514 coupled between the internal-feedback nodes 520, 522 to provide feedback between the transistors.

The current drawn by Gm circuit 500 at node 524 and at node 526 may be approximately equal to the differential-input voltage (e.g., the voltage difference between differential inputs 501 and 503) divided by twice the feedback resistance. When bipolar-junction transistors are used, the voltage at internal-feedback node 520 may be approximately equal to the voltage at differential input 503 (Vinm) minus twice the base-emitter voltage ($V_{BE}$) of the transistors. The voltage at internal-feedback node 522 may be approximately equal to the voltage at differential input 501 (Vinp) minus twice the base-emitter voltage. Unlike GmC circuit 400 (FIG. 4), the differential-input voltage across nodes 501 and 503 substantially controls the current drawn through the transistors of circuit 500.

FIG. 6 is a block diagram of a transconductance-capacitor (GmC) polyphase filter in accordance with some embodiments of the present invention. GmC polyphase filter 600 may be a first-order polyphase filter suitable as an image-rejection filter and may be used for rejecting an image signal from a baseband-differential signal in receiver 100 (FIG. 1). For example, filter 600 may be provided in the signal paths between filters 106, 107 (FIG. 1) and ADC 112 (FIG. 1). In some embodiments, filter 600 may be provided between buffers 108, 109 (FIG. 1) and ADC 112 (FIG. 1).

First-order GmC polyphase filter 600 may comprise current-mode transconductance-resistor-capacitor (GmRC) circuits 610, 612 to receive differential input currents respectively from first and second input Gm circuits 602, 604. GmRC circuits 610, 612 may generate differential output currents for combining respectively with differential output currents from input Gm circuits 606, 608 to generate I and Q-channel output differential voltage signals 614, 616. Input Gm circuits 602, 604, 606 and 608 may respectively receive I-channel and Q-channel differential baseband voltage signals 601, 603 and generate differential currents proportional to the received differential-baseband signals. In some embodiments, Gm circuit 500 (FIG. 5) may be suitable for use as one or more of Gm circuits 602, 604, 606 and 608, although the scope of the invention is not limited in this respect.

FIG. 7 is a circuit diagram of current-mode transconductance-resistor-capacitor (GmRC) circuit in accordance with some embodiments of the present invention. GmRC circuit 700 may be suitable for use as GmRC circuits 610 and/or 612 (FIG. 6) although other circuits may also be suitable. GmRC circuit 700 provides a differential-output current at nodes 701 and 703 based on a differential input current between nodes 705 and 707.

GmRC circuit 700 includes cross-coupled transistors, capacitors 702 and 704, and feedback resistors 708 and 710 in addition to various current sources. Capacitors 702 and 704 may be voltage-dependent capacitors, such as MOSCAPs, which during operation may be DC biased in their linear region. When circuit 700 is used in a filter, such as filter 600 (FIG. 6), an image frequency at approximately ½ pRC may be rejected. R may be the value of feedback resistors 708 and 710, and C/2 may be the value of capacitors 702 and 704. In some embodiments, circuit 700 may provide a differential-output current at nodes 701 and 703 based on the differential input current divided R and C. In some embodiments, R may range from 50 Ohms to more than 100K Ohms, and C may range from 0.1 pF to more than 100 pF, although the scope of the invention is not limited in this respect.

In some embodiments, GmRC circuit 700 takes advantage of the Miller-capacitor effect and may provide up to four or more times reduction in capacitor layout area. In some embodiments, the transistors of circuit 700 may be BJTs and their $V_{BE}$ may be relatively constant over a wide operational range. When used in filter 600 (FIG. 6), from an AC perspective MOSCAPs 702 and 704 are operationally (not actually) coupled across the inputs of filter 600 (FIG. 6), and their capacitance may be enhanced due to the Miller-effect. From a DC perspective, MOSCAPs 702 and 704 may be DC biased at approximately 2.1 volts +/− the voltage difference between input nodes 705 and 707. This voltage may bias the MOSCAPs well within their linear region helping to help achieve high-density and high-linear operation. In addition, a wider operating range may be achieved and high-frequency leakage from the capacitors to the output may be significantly reduced and possibly eliminated.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. An apparatus comprising:
    a mixer to convert an RF signal to a baseband-differential signal; and
    a transconductance-capacitor (GmC) filter to filter the baseband-differential signal, wherein the GmC filter comprises:
    first and second transconductance-capacitor circuits in series and a transconductance-feedback circuit in feedback with the second transconductance-capacitor circuit,
    wherein at least one of the first or second transconductance-capacitor circuits comprises:
    cross-coupled pairs of transistors to receive the baseband-differential signal and generate a differential output current; and
    first and second capacitors coupled respectively between differential inputs of at least one the transconductance-capacitor circuit and first and second internal-feedback nodes of at least one the transconductance-capacitor circuit,
    wherein the capacitors are voltage-dependent capacitors, and
    wherein during operation of the GmC filter, a substantially-constant bias voltage is maintained across the voltage-dependent capacitors to allow the voltage-dependent capacitors to provide a substantially constant capacitance.

2. The apparatus of claim 1 wherein the differential-output current is substantially proportional to a differential-input voltage of the baseband-differential signal, and
    wherein at least one of the transconductance-capacitor circuits further comprises:
    first and second current sources coupled respectively to the first and second internal-feedback nodes to draw current through the transistors for generating the differential output current; and
    a feedback resistor coupled between the internal-feedback nodes.

3. The apparatus of claim 1 wherein the voltage-dependent capacitors comprise metal-oxide-semiconductor capacitors (MOSCAPs), wherein the substantially-constant bias voltage allows the MOSCAPs to be operated in a high-density and low-variation portion of the voltage-dependent capacitors' capacitance-response curve to provide a substantially constant capacitance as a function of voltage thereacross.

4. The apparatus of claim 1 wherein the transistors of the cross-coupled pairs comprise bipolar junction transistors (BJTs), and wherein the substantially-constant bias voltage is approximately $2V_{BE}$ during the operation of the GmC filter.

5. The apparatus of claim 1 wherein the transistors of the cross-coupled pairs comprise field-effect transistors.

6. The apparatus of claim 1 wherein the GmC filter has at least two poles, and
wherein the first transconductance-capacitor circuit is to provide a first pole for the GmC filter corresponding to an output pole of the mixer, and
wherein the second transconductance-capacitor circuit and the transconductance-feedback circuit are to provide a second pole of the GmC filter.

7. The apparatus of claim 1 wherein the transconductance-feedback circuit comprises:
first and second current sources coupled respectively to first and second internal-feedback nodes to draw current through the transistors for generating the differential output current; and
a feedback resistor coupled between the internal-feedback nodes.

8. The apparatus of claim 1 further comprising:
a low-noise amplifier (LNA) to amplify and provide a received RF signal to the mixer; and
a voltage buffer to receive the filtered baseband-differential signal from the GmC filter to provide an output differential signal to an analog-to-digital converter (ADC).

9. The apparatus of claim 8 wherein the mixer is an in-phase (I) channel mixer to generate an I-channel baseband-differential signal, the GmC filter is an I-channel GmC filter and the voltage buffer is an I-channel voltage buffer to receive the filtered I-channel baseband-differential signal from the I-channel GmC filter, and
wherein the apparatus further comprises:
a quadrature-phase (Q) channel mixer to generate a Q-channel baseband-differential signal;
a Q-channel GmC filter to filter the Q-channel baseband-differential signal; and
a Q-channel voltage buffer to receive the filtered Q-channel baseband-differential signal and provide a Q-channel output differential signal to the ADC.

10. The apparatus of claim 8 wherein the RF signal comprises signals at either approximately 2.4 GHz or 5.0 GHz.

11. The apparatus of claim 8 wherein the RF signal comprises wideband code-division multiple access (WCDMA) signals.

12. The apparatus of claim 8 wherein the RF signal comprises orthogonal frequency division multiplexed signals having symbol-modulated orthogonal subcarriers.

13. An apparatus comprising:
a mixer to convert an RF signal to a baseband-differential signal;
a transconductance-capacitor (GmC) filter to filter the baseband-differential signal;
a low-noise amplifier (LNA) to amplify and provide a received RF signal to the mixer; and
a voltage buffer to receive the filtered baseband-differential signal from the GmC filter to provide an output differential signal to an analog-to-digital converter (ADC),
wherein the GmC filter comprises first and second transconductance-capacitor circuits in series and a transconductance-feedback circuit in feedback with the second transconductance-capacitor circuit;
wherein the mixer is an in-phase (I) channel mixer to generate an I-channel baseband-differential signal, the GmC filter is an I-channel GmC filter and the voltage buffer is an I-channel voltage buffer to receive the filtered I-channel baseband-differential signal from the I-channel GmC filter, and
wherein the apparatus further comprises:
a quadrature-phase (Q) channel mixer to generate a Q-channel baseband-differential signal;
a Q-channel GmC filter to filter the Q-channel baseband-differential signal; and
a Q-channel voltage buffer to receive the filtered Q-channel baseband-differential signal and provide a Q-channel output differential signal to the ADC.
wherein the Q-channel GmC filter comprises;
first and second Q-channel voltage-dependent capacitors coupled respectively between differential inputs of at least one Q-channel transconductance-capacitor circuit and first and second internal-feedback nodes of at least one of the Q-channel transconductance-capacitor circuit,
wherein during operation of the Q-channel GmC filter, a substantially-constant bias voltage is maintained across the Q-channel voltage-dependent capacitors to allow the Q-channel voltage-dependent capacitors to provide a substantially constant capacitance.

14. An apparatus comprising:
first and second transconductance-capacitor circuits in series; and
a transconductance-feedback circuit in feedback with the second transconductance-capacitor circuit,
wherein at least one of the first or second transconductance-capacitor circuits comprises:
cross-coupled pairs of transistors to receive a baseband-differential signal and generate a differential output current; and
first and second capacitors coupled respectively between differential inputs of at least one of the transconductance-capacitor circuit and first and second internal-feedback nodes of at least one of the transconductance-capacitor circuit,
wherein the differential-output current is substantially proportional to a differential-input voltage of the baseband-differential signal, and
wherein at least one the of transconductance-capacitor circuit further comprises:
first and second current sources coupled respectively to the first and second internal-feedback nodes to draw current through the transistors for generating the differential output current; and
a feedback resistor coupled between the internal-feedback nodes,
wherein the capacitors are voltage-dependent capacitors, and
wherein during operation of the GmC filter, a substantially-constant bias voltage is maintained across the voltage-dependent capacitors to allow the voltage-dependent capacitors to provide a substantially constant capacitance.

15. The apparatus of claim 14 wherein the voltage-dependent capacitors comprise metal-oxide-semiconductor capacitors (MOSCAPs), wherein the substantially-constant bias voltage allows the MOSCAPs to be operated in a high-density and low-variation portion of the voltage-dependent capacitors' capacitance-response curve to provide a substantially constant capacitance as a function of voltage thereacross.

16. The apparatus of claim 14 wherein the transistors of the cross-coupled pairs comprise bipolar junction transistors (BJTs), and wherein the substantially-constant bias voltage is approximately $2V_{BE}$ during the operation of the GmC filter.

17. The apparatus of claim 14 wherein the first transconductance-capacitor circuit is to provide a first pole for the GmC filter, and
wherein the second transconductance-capacitor circuit and the transconductance-feedback circuit are to provide a second pole of the GmC filter.

18. The apparatus of claim 14 wherein the transconductance-feedback circuit is a second transconductance-feedback circuit, and
wherein the GmC filter further comprises:
an input transconductance circuit; and
a first transconductance-feedback circuit in feedback with the first transconductance-capacitor circuit.

19. An apparatus comprising:
first, second, third and fourth input transconductance circuits to generate differential currents from differential baseband signals;
first and second current-mode transconductance-resistor-capacitor (GmRC) circuits coupled to the first and second input transconductance circuits for receiving the differential currents respectively from the first and second input transconductance circuits and for generating differential output currents; and
circuitry for combining respectively with the differential currents generated by the third and fourth input transconductance circuits with the differential output currents generated by the first and second current-mode transconductance-resistor-capacitor circuits to generate respectively in-phase (I) channel and quadrature-phase (Q) channel output differential voltage signals.

20. The apparatus of claim 19 wherein the input transconductance circuits respectively receive I-channel and Q-channel differential baseband voltage signals and generate differential currents proportional to the received differential-baseband signals.

21. The apparatus of claim 19 wherein the GmRC circuits comprise:
a plurality of cross-coupled transistors;
first and second feedback resistors having a value of R; and
voltage-dependent capacitors DC to be biased by some of the transistors to operate in a linear region and having a value of C/2,
wherein the filter is to reject an image frequency at approximately $\frac{1}{2\pi RC}$.

22. An apparatus comprising:
a plurality of cross-coupled transistors to receive a differential input current;
first and second feedback resistors coupled between some of the transistors; and
voltage-dependent capacitors to be biased by the transistors to operate in a linear region to integrate the received differential input current.
Wherein the cross coupled transistors draw a differential output current that is inversely proportional to values of the first and second feedback resistors and the voltage-dependent capacitors.

23. The apparatus of claim 22 wherein the voltage-dependent capacitors have a value of C/2, and wherein the first and second feedback resistors have a value of R, and
wherein a differential-output current is further based on the differential divided by R and C.

24. The apparatus of claim 23 further comprising a plurality of current sources to draw the bias current through the plurality of cross coupled transistors and to provide a substantially-constant bias voltage across the voltage-dependent capacitors.

25. A system comprising:
an omnidirectional antenna to receive an RF signal;
in-phase (I) channel and quadrature-phase (Q) channel mixers to convert the received RF signal to baseband-differential signals; and
I and Q-channel transconductance-capacitor (GmC) filters to filter the baseband-differential signal, wherein the GmC filters comprise:
first and second transconductance-capacitor circuits in series and a transconductance-feedback circuit in feedback with the second transconductance-capacitor circuit,
wherein at least one of the first and second transconductance-capacitor circuits comprises:
cross-coupled pairs of transistors to receive the baseband-differential signal and generate a differential output current; and
first and second voltage-dependent capacitors coupled respectively between differential inputs of at least one the transconductance-capacitor circuit and first and second internal-feedback nodes of at least one the transconductance-capacitor circuit.

26. The system of claim 25 further comprising a low-noise amplifier (LNA) to amplify and provide the received RF signal to the I-channel mixer and the Q-channel mixer.

27. The system of claim 25 wherein a substantially-constant bias voltage is maintained across the voltage-dependent capacitors to allow the voltage-dependent capacitors to maintain a substantially constant capacitance.

28. The system of claim 25 further comprising:
an analog-to-digital converter (ADC); and
I and Q-channel voltage buffers to receive the filtered baseband-differential signal from the I and Q-channel GmC filters to provide an output differential signal to the ADC.

29. The system of claim 28 further comprising an image-rejection filter to reject an image signal from the filtered baseband-differential signal from the I and Q-channel GmC filters.

30. The system of claim 29 wherein the image rejection filter comprises a first-order poly-phase filter comprising current-mode transconductance-resistor-capacitor (GmRC) circuits to receive differential input currents respectively from the first and second input transconductance circuits and generate differential output currents for combining respectively with differential output currents from third and fourth input transconductance circuits to generate I and Q output differential voltage signals.

31. The system of claim 30 wherein the input transconductance circuits respectively to receive I and Q-channel differential baseband voltage signals and to generate differential currents proportional to the received differential-baseband signals.

32. The system of claim 30 wherein the GmRC circuits comprise:
 a plurality of cross-coupled transistors;
 first and second feedback resistors having a value of R; and
 voltage-dependent capacitors biased by some of the transistors to operate in a linear region and having a value of C/2,
 wherein the image-rejection filter to at least partially reject an image frequency at approximately $1/2\pi RC$.

* * * * *

UNITED STATES PATENT AND TRADEMARK OFFICE
CERTIFICATE OF CORRECTION

| | | |
|---|---|---|
| PATENT NO. | : 7,139,544 B2 | Page 1 of 1 |
| APPLICATION NO. | : 10/668638 | |
| DATED | : November 21, 2006 | |
| INVENTOR(S) | : Smith et al. | |

It is certified that error appears in the above-identified patent and that said Letters Patent is hereby corrected as shown below:

In column 8, line 43, in Claim 1, delete "at least one transconductance-capacitor" and insert -- the at least one transconductance-capacitor --.

In column 10, line 18, in Claim 13, delete "ADC." and insert -- ADC, --, therefor.

In column 10, line 49, in Claim 14, delete "at least one the of transconductance-capacitor" and insert -- the at least one transconductance-capacitor --, therefor.

In column 11, line 63, in Claim 22, delete "current." and insert -- current, --, therefor.

In column 11, line 64, in Claim 22, delete "Wherein" and insert -- wherein --, therefor.

In column 12, line 4, in Claim 23, delete "a" and insert -- the --, therefor.

In column 12, line 5, in Claim 23, after "differential" insert -- input current --.

In column 12, lines 33-34, in Claim 25, delete "at least one the transconductance-capacitor" and insert -- the at least one transconductance-capacitor --.

In column 12, lines 35-36, in Claim 25, delete "at least one the transconductance-capacitor" and insert -- the at least one transconductance-capacitor --.

Signed and Sealed this

Twentieth Day of February, 2007

JON W. DUDAS
*Director of the United States Patent and Trademark Office*